United States Patent [19]

Hasegawa

[11] Patent Number: 5,572,265
[45] Date of Patent: Nov. 5, 1996

[54] NOSE PAD DEVICE FOR GLASSES

[75] Inventor: Keizo Hasegawa, Tokyo, Japan

[73] Assignee: Hasegawa Bicoh Co., Ltd., Tokyo, Japan

[21] Appl. No.: 559,170

[22] Filed: Nov. 13, 1995

[30] Foreign Application Priority Data

Jul. 24, 1995 [JP] Japan ................................. 7-207310

[51] Int. Cl.$^6$ ................................. G02C 5/12; G02C 1/00
[52] U.S. Cl. ................................. 351/137; 351/78
[58] Field of Search ................................. 351/136, 137, 351/138, 78, 80, 132

[56] References Cited

FOREIGN PATENT DOCUMENTS 0080228  6/1983  European Pat. Off. ............... 351/137

Primary Examiner—Huy Mai
Attorney, Agent, or Firm—Kanesaka & Takeuchi

[57] ABSTRACT

A nose pad device for glasses is formed of a pad engaging portion fixed to a frame for the glasses, a nose pad and an attaching member installed between the pad engaging portion and the nose pad. The attaching member includes a base portion to be attached to the pad engaging portion, a pair of resilient legs fixed to the base portion, and two first fixing portions fixed to the legs. The legs extend in a direction away from the base portion such that as a distance from the base portion increases, a distance between the resilient legs increases. The nose pad has two second fixing portions to be attached to the first fixing portions. The nose pad is resiliently attached to the frame by the resilient legs.

6 Claims, 2 Drawing Sheets

NOSE PAD DEVICE FOR GLASSES

BACKGROUND OF THE INVENTION AND RELATED ART STATEMENT

The present invention relates to a nose pad device for glasses, which properly places or holds the glasses on a nose of a wearer.

The glasses must be placed properly on a face of a wearer. Otherwise, the glasses can not function adequately, or even harm the eyes of the wearer.

As devices for properly locating the glasses on a face of a wearer, there are nose pads. The nose pads are attached to a frame of the glasses, and when the glasses are worn, the nose pads are located on a nose of the wearer to properly place or hold the glasses.

The nose pads are very important. If the nose pads are not properly adjusted or the locations of the nose pads are not proper, the lens are not positioned adequately relative to the eyes. Thus, the function for adjustment of eyesight by the glasses is lowered. Also, while the glasses are worn, the glasses may fall or slip down. Namely, the nose pads may cause wearing problems of the glasses.

In order to improve the above problems, it was proposed to change the quality of the material for making the nose pad. For example, the nose pads were made of silicone resin to increase friction so that the glasses do not fall easily, and the feeling in wearing the glasses is improved. However, the above attempts were not satisfactory.

Also, in order to improve the holding or fitting ability of the glasses, there was an attempt such that the pressure of the pads to the nose was increased by pulling the glasses strongly by temples. However, it is inevitable that the feeling in wearing the glasses went wrong. Further, when the nose pads strongly push the skin of the nose, congestion occurs at the skin behind the nose pads, and when the glasses are taken off, the congestion does not disappear for a long time. This is one of the main reasons that a person, especially a woman, does not like to wear the glasses.

The present invention has been made to obviate the above problems relative to the holding or fitting of the glasses on a face of a wearer.

One object of the invention is to provide a nose pad device for glasses, which can surely hold or fit the glasses on a face of a wearer while providing a good feeling in wearing the glasses.

Another object of the invention is to provide a nose pad device as stated above, which does not generally put or make a sign of the nose pad on a skin of the wearer when the glasses are taken off.

A further object of the invention is to provide a nose pad device as stated above, which can resiliently absorb a force or impact applied to the nose pads.

Further objects and advantages of the invention will be apparent from the following description of the invention.

SUMMARY OF THE INVENTION

In accordance with the present invention, a nose pad device for the glasses is basically formed of a pad engaging portion fixed to a frame for the glasses, a nose pad, and an attaching member situated between the pad engaging portion and the nose pad. The attaching member includes a base portion to be attached to the pad engaging portion, a pair of resilient legs fixed to the base portion, and two first fixing portions. Each first fixing portion is fixed to the distal end of the leg and is fixed to the nose pad.

The legs extend in the directions away from the base portion such that as a distance from the base portion increases, a distance between the resilient legs increases. Namely, the legs extend in the opposite directions. The nose pad has two second fixing portions to be attached to the first fixing portions. When the nose pad is fixed to the frame through the attaching member, the nose pad is resiliently attached to the frame.

In the invention, since the nose pad is resiliently attached to the frame through the resilient legs, the resilient legs may incline or move when the glasses are worn or a pressure is applied to the frame. Namely, the force between the nose pad and the frame is absorbed by the resilient legs. The nose pad touches the nose of the wearer in a natural posture.

Each resilient leg includes at least one corrugated portion between the base portion and the first fixing portion. The corrugated portion absorbs pressure applied between the nose pad and the frame to allow the nose pad to snugly contact the nose of the wearer. Preferably, the resilient legs are attached at one side of the base portion and extend substantially in the opposite directions The attaching portion may be made of resin and integrally formed together as one unit.

DETAILED DESCRIPTION OF PREFERRED EMBODIMENTS

Figure 1:
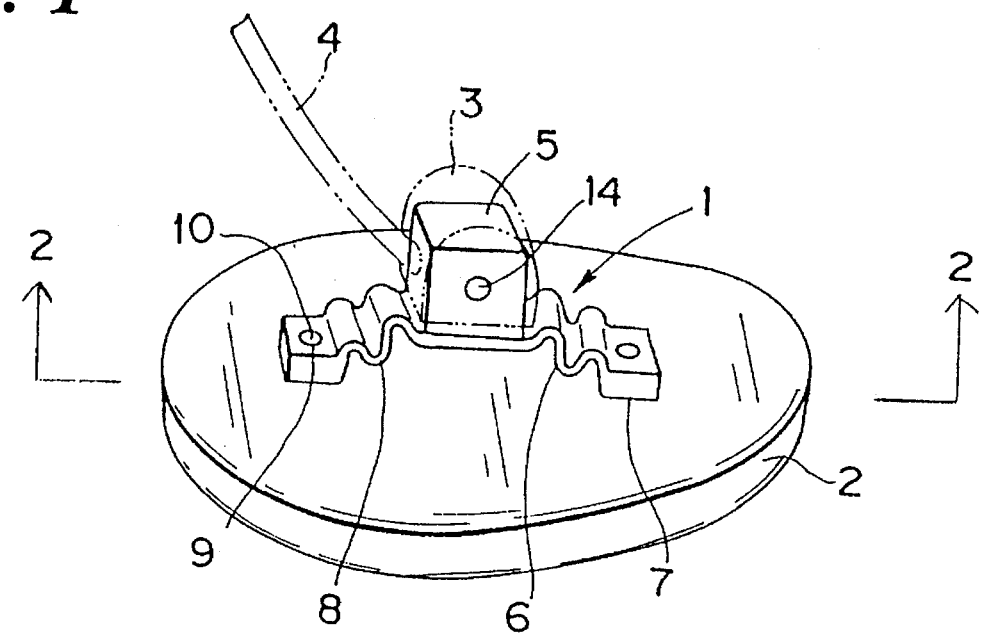
FIG. 1 is a perspective view of a nose pad device of the present invention.
Figure 2:
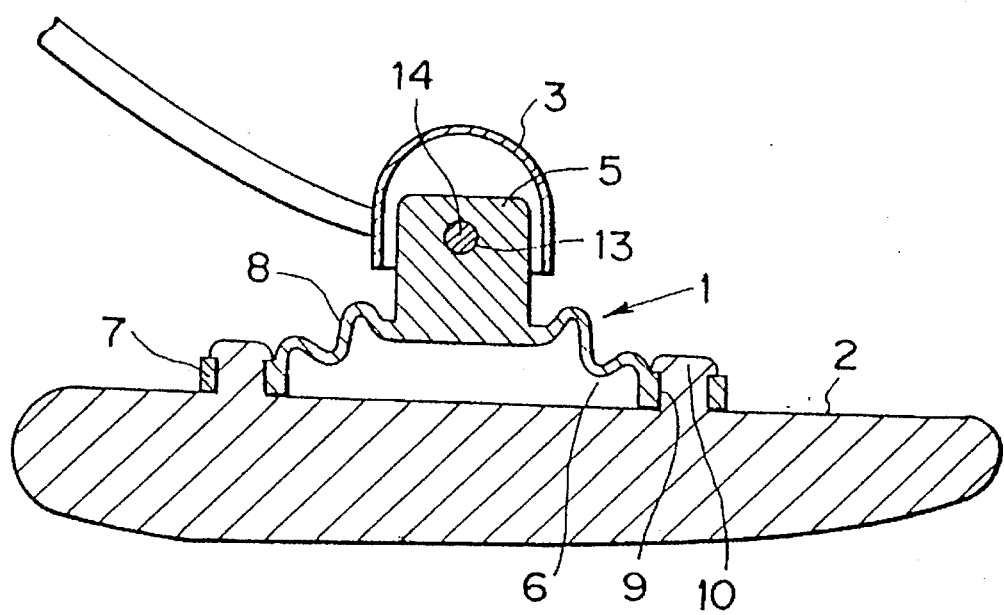
FIG. 2 is a sectional view taken along line 2—2 in FIG. 1.
Figure 3:
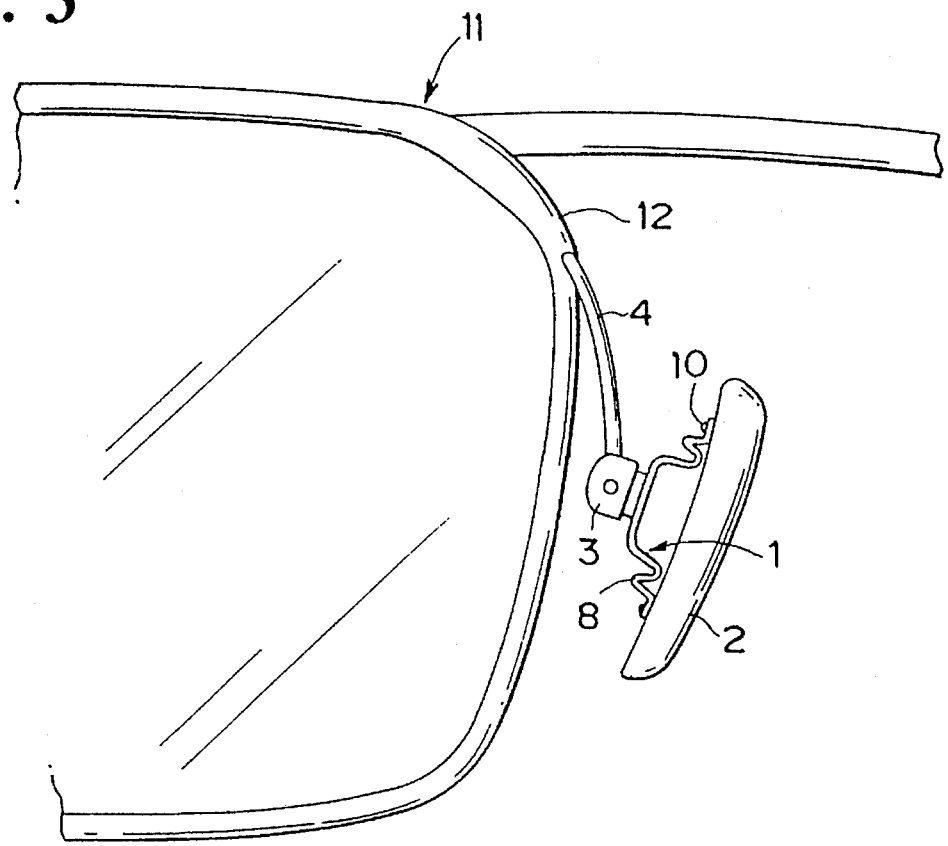
FIG. 3 is an explanatory side view for showing a part of glasses with the nose pad.

FIGS. 1–3 show a first embodiment of the present invention. An attaching member 1 connects a nose pad 2 to a nose pad box 3 attached to a metal rod 4 extending from a periphery 12 of a frame 11 (FIG. 3). The nose pad box 3 has a dome shape with an opening at one side thereof.

The attaching member 1 is formed of a base portion 5 in a square shape to be attached to the nose pad box 3, two legs 6 extending from the base portion 5, and two fixing portions 7 attached to distal ends of the respective legs 6. The attaching member 1 is integrally made of resin so that the legs 6 have resiliency.

The base portion 5 is inserted into the nose pad box 5 through the opening, and is fixed thereto. The base portion 5 may be fixed to the nose pad box 3 by any known means, such as a nylon thread, screw, engaging projection and so on, situated between the base portion 5 and the nose pad box 3. In this embodiment, through holes 13 are formed in the nose pad box 3 and the base portion 5, through which a nylon thread 14 passes. The nylon thread 14 is cut to slightly project outwardly from the nose pad box 3, and the ends of the thread 14 are heated and crushed. Accordingly, the base portion 5 is immovably fixed in the nose pad box 3.

The legs 6 project in the opposite directions from a lower portion of the base portion 5 and orient slightly downwardly. Each leg 6 has a corrugated portion 8 in a middle portion and comes to a flat end forming the fixing portion 7. In the embodiment of FIGS. 1–3, the legs 6 are constructed by one pair, and are arranged symmetrically relative to the base portion 5. The corrugated portions 8 and the fixing portions 7 are also arranged symmetrically. However, the legs 6 with the corrugated portions 8 and the fixing portions 7 need not be arranged symmetrically, and may be formed asymmetrically in the right and left portions depending on the shape of the frame of the glasses.

The fixing portions 7 are fixed to a rear surface of the nose pad 2 in a conventional method. In this example, each fixing portion 7 includes a through hole 9, and the nose pad 2 includes projections 10 projecting from the rear surface. The projections 10 are inserted into the through holes 9 of the fixing portions 7, and the top ends of the projections are deformed by heat. Accordingly, the fixing portions 7 are fixed to the nose pad 2.

Figure 4:
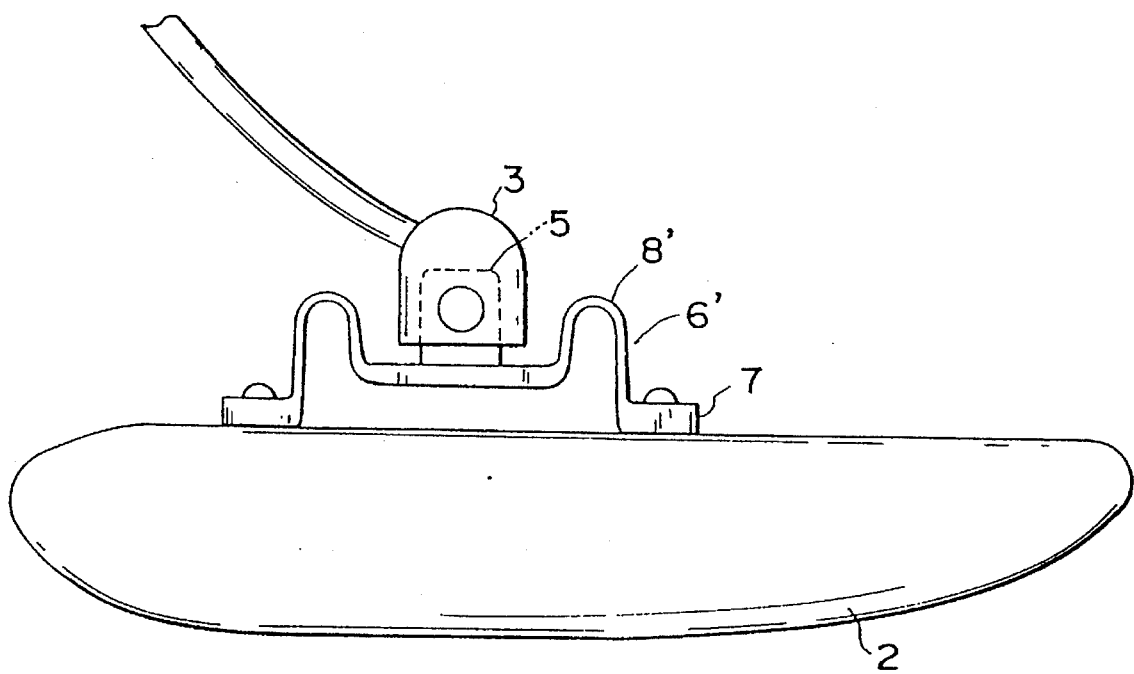
FIG. 4 is a side view of a different nose pad device of the invention.

In the embodiment, the corrugated portion 8 has two curved portions at upper and lower portions. However, as shown in FIG. 4, a leg 6' may have a corrugated portion 8' with one curved portion. In this respect, as the number of the curved portions in the corrugated portion 8 increases, flexibility or resiliency of the leg 6 increases. The number of the curved portions is determined based on the design and forming process of the attaching member 1.

The attaching member 1 for the nose pad is integrally formed with resin having resiliency. The resin may be a soft elastomer, such as polyester resin, polyamide resin and so on, in view of easiness for processing, strength for a long time and economy. Also, hardness of the resin is, preferably, 30–80 in shear hardness.

When the glasses with the attaching members 1 of the invention are worn, the pressure applied between the nose pad 2 and the frame 11 is respectively absorbed by the corrugated portion 8. The nose pad 2 may tilt or the distance between the nose pad box and the nose pad changes depending on the direction that the pressure is applied and the amount of the pressure between the nose pad box and the nose pad.

In the present invention, when the glasses are worn, the nose pads contact a nose of a wearer in a most natural condition without any specific force, so that irregular pressure is not concentrated at one portion of the nose of the wearer. The nose pads can provide good feeling in wearing the glasses. Even if the wearer moves excessively, the glasses do not generally slip.

Further, even if the glasses are worn for a long time, the pressure sign by the nose pads is not formed at the contact portion on the skin. Namely, congestion is not formed on the nose by the glasses. Therefore, the glasses with the attaching members of the invention are especially useful for woman.

While the invention has been explained with reference to the specific embodiments of the invention, the explanation is illustrative and the invention is limited only by the appended claims.

What is claimed is:

1. A nose pad device for glasses with a frame, comprising:
   a pad engaging portion fixed to the frame,
   an attaching member including a base portion to be attached to the pad engaging portion, a pair of resilient legs fixed to the base portion and extending in a direction away from the base portion such that as a distance from the base portion increases, a distance between the resilient legs increases, each resilient leg having a distal end, and two first fixing portions, each being fixed to the distal end of the leg, and
   a nose pad having two second fixing portions to be attached to the first fixing portions so that the nose pad is resiliently attached to the frame.

2. A nose pad device according to claim 1, wherein each resilient leg includes at least one corrugated portion between the base portion and the first fixing portion so that the corrugated portion absorbs pressure applied from the nose pad to allow the nose pad to snugly contact a nose of a wearer.

3. A nose pad device according to claim 2, wherein said resilient legs are attached at one side of the base portion and extend substantially opposite to each other.

4. A nose pad device according to claim 3, wherein said attaching portion is made of a resin and integrally formed together as one unit.

5. A nose pad device according to claim 4, wherein said pad engaging portion has a box shape to receive the base portion therein.

6. A nose pad device according to claim 5, wherein said first fixing portion is a hole, and said second fixing portion is a projection extending from the nose pad.

* * * * *